United States Patent

Carper

(10) Patent No.: US 6,902,692 B2
(45) Date of Patent: Jun. 7, 2005

(54) PROCESS FOR MAKING A FIBER REINFORCED ARTICLE

(75) Inventor: Douglas Melton Carper, Blue Ash, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/244,283

(22) Filed: Sep. 16, 2002

(65) Prior Publication Data

US 2003/0012939 A1 Jan. 16, 2003

Related U.S. Application Data

(62) Division of application No. 09/626,981, filed on Jul. 27, 2000.

(51) Int. Cl.[7] .......................... B29C 70/60; B29C 70/88
(52) U.S. Cl. ...................... 264/40.1; 264/257; 264/258; 264/327
(58) Field of Search ............................. 204/257, 258, 204/327

(56) References Cited

U.S. PATENT DOCUMENTS

| | | | |
|---|---|---|---|
| 3,565,740 A | 2/1971 | Lazar et al. | 161/57 |
| 3,573,123 A | 3/1971 | Siegel et al. | 156/171 |
| 3,756,746 A | 9/1973 | Baker | 416/230 |
| 4,022,547 A | 5/1977 | Stanley | 416/230 |
| 4,407,885 A | 10/1983 | Murphy et al. | 428/246 |
| 4,739,738 A * | 4/1988 | Sander et al. | 123/193.6 |
| 5,545,484 A * | 8/1996 | Yamaguchi et al. | 428/408 |
| 5,553,455 A * | 9/1996 | Craig et al. | 60/753 |
| 5,851,326 A | 12/1998 | Custer et al. | 156/89.22 |
| 5,945,166 A * | 8/1999 | Singh et al. | 427/376.2 |
| 6,251,815 B1 | 6/2001 | Parthasarathy et al. | 501/95.2 |
| 6,316,086 B1 | 11/2001 | Beier et al. | 428/293.4 |

* cited by examiner

Primary Examiner—Stefan Staicovici
(74) Attorney, Agent, or Firm—David L. Narciso; Lee H. Sachs

(57) ABSTRACT

A fiber reinforced composite article comprising a matrix and reinforcing fibers, and different operating temperature and stress combinations each across opposed surfaces and through the matrix, is made by first measuring each of the combinations. Then discrete regions, each extending completely through the surfaces and the matrix, are selected for each combination. Reinforcing fibers with strength greater than the stress in a selected region are disposed in each selected region, the strengths being different between regions responsive to the different measured combinations.

14 Claims, 2 Drawing Sheets

PROCESS FOR MAKING A FIBER REINFORCED ARTICLE

This application is a division of application Ser. No. 09/626,981, filed Jul. 27, 2000.

BACKGROUND OF THE INVENTION

This invention relates to a member comprising fibers, to a composite article reinforced with fibers, and to a method for making such member and article. More particularly, in one form, it relates to a fiber reinforced composite article that, during service operation, experiences concurrently a plurality of temperatures and stresses varying between a plurality of regions of the article.

In power generation apparatus, for example a gas turbine engine, wide variations in operating temperatures are experienced from inlet to exhaust, as well as across or within individual components of such an engine. An example of such thermal variation has been observed within the engine exhaust system across or within regions of panels such as exhaust flaps. Another example is a turbine engine blading component, such as a blade, vane, strut, etc., having a surface or skin region that experiences a temperature greater than does reinforcing or strengthening spars in the component.

Such high thermal gradients across or within such an article or component or within a region, sometimes called a hot spot, of the article has generated relatively high thermal strains sufficient to limit the operating capability of the article. For example, cooler edge regions of a gas turbine engine exhaust flap, made of a high temperature oxide fiber reinforced ceramic matrix composite material, existing concurrently with a higher temperature region within or away from the edge regions, have been observed to develop cracks that can decrease the operating life of the article. Such degradation is believed to result from the inability of the reinforced structure of an article, made generally from a single kind of material, to compensate for different stress levels developed from a stress conflict between different temperature regions. The reinforced matrix of the composite including reinforcing fibers, for example of a single kind, alone does not have the capability to withstand or compensate for such wide strain variations across the operating temperature range of the article.

BRIEF SUMMARY OF THE INVENTION

The present invention, in one form, provides a fiber reinforced composite article comprising a matrix and reinforcing fibers. During operation, the article experiences concurrently in the article a plurality of operating temperatures varying between a plurality of regions of the article. For example, operating temperatures can vary within a total temperature range of about 900–2000° F. In one form of operation, a first region of the article experiences a first temperature, for example of about 1800° F. in the range of about 1600–2000° F., that develops a first stress in that first region of the article. Concurrently in operation with the first region, a second region of the article experiences a second temperature less than the first temperature, for example of about 1100° F. in the range of about 900–1300° F., that develops a second stress in that second region of the article greater than the first stress. Such difference in stress between regions of a fiber reinforced composite article has been observed to result in cracking in higher stressed, lower temperature region, for example at an edge portion of an article.

A form of the present invention provides, for a plurality of regions of an article, strength levels of reinforcing fibers adequate to compensate for the operating stress level in its respective region. The fibers appropriately are selected for each region in making an article or a reinforcing member, to provide a strength level greater than the respective stress experienced at operating temperature in that region. In part, as will be described below, such strength levels are based on use of fibers in a matrix having different coefficients of thermal expansion (CTE), sometimes referred to as "α", determined at the intended operating temperature. In one form, the selection of fibers to provide appropriate strength levels in the regions is based on a difference in thermal stress levels from the product of the following for each region: a ratio of each respective area of a region to the total area of an article portion, the elastic modulus of the fiber reinforced matrix, the CTE of such reinforced matrix, and the temperature at which each region operates. In that form of the invention, such product of the first, relatively hotter, region is less than such product for the second, relatively cooler region. One form of such a relationship, to be referred to hereinafter as the "relationship", is $A_1E_1\alpha_1T_1 - A_2E_2\alpha_2T_2 < S_2$, in which, as identified above, respectively for the regions 1 and 2, A is the area ratio of a region to a total area of the regions, E is the elastic modulus of the fiber reinforced matrix, α is the CTE of the fiber reinforced matrix at the operating temperature in ° F., T is the operating temperature in ° F., and S is the strength of a relatively cooler region. In this example, the second region, region 2, has a second strength greater than the first strength in the first region.

Another form of the invention is a member in the form of a mixture of such first and second fibers, for example as a fabric, weave, braid, lay-up, etc., used to make a fiber reinforced composite article. Still other forms are methods of making such a member or making such an article, comprising selecting the first and second fibers and their relative mixture and location in the member or article as a function of their intended operating conditions.

DETAILED DESCRIPTION OF THE INVENTION

Currently, one form of gas turbine engine exhaust flap, conveniently represented generally in the form of a panel, is made of a ceramic matrix reinforced generally uniformly throughout with a single kind of high temperature oxide fiber. One form of such an exhaust flap includes an aluminosilicate matrix, made from commercially available SM8 sub-micron alumina powder and silica. The matrix is reinforced with an oxide fiber nominally comprising, by weight, 85% alumina and 15% silica, and commercially available as Nextel 720 roving material. During one type of service operation, the exhaust flap experienced a first temperature ranging from about 1600–2000° F. in at least one region away from peripheral edge regions, within the panel, to a second temperature less than the first temperature and in the range of about 900–1300° F. at peripheral regions of the flap. It was observed that such temperature variation in the flap caused cracking at peripheral edges resulting from excessive strain of the composite at such cooler points, while maintaining the integrity of the structure in the hotter region.

Figure 1:
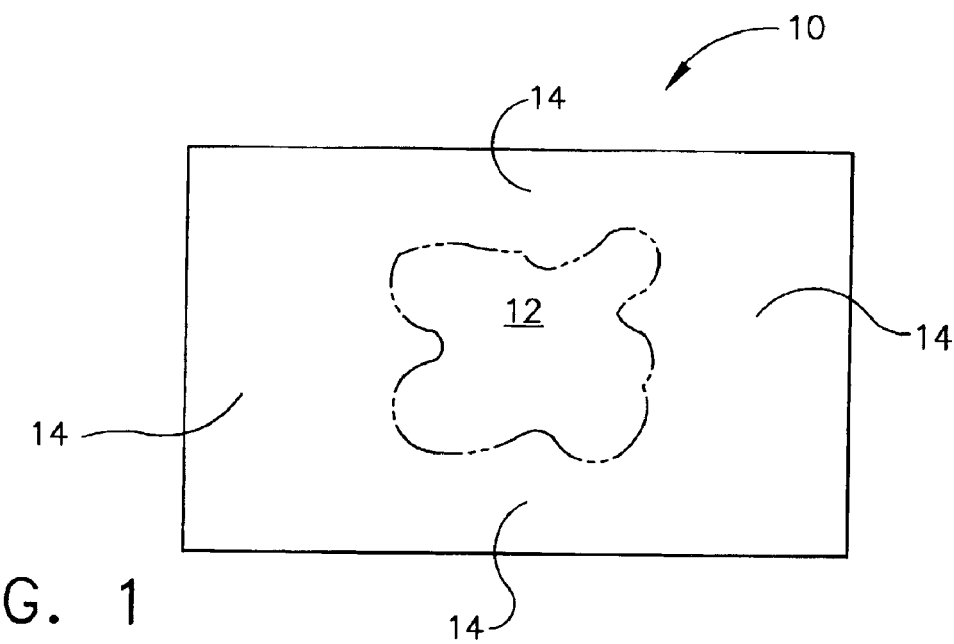
FIG. 1 is a diagrammatic view of a panel representing one form of article provided according to the present invention, in which operating temperature varies from a region within the panel outwardly toward the panel edge regions.

One diagrammatic embodiment of a panel intended to experience the type of service operation described above is shown in the diagrammatic view of FIG. 1. The panel shown generally at 10 represents, diagrammatically, an article such as a gas turbine engine exhaust flap. During service operation of the panel, the at least one first region 12, away from peripheral edge or second region 14 is shown to be generally discrete from edge region 14 within the panel. First region 12 experiences a first temperature greater than a second temperature experienced by edge region 14.

One form of the present invention avoids generation of excessive, destructive strain in the panel by disposing in each of the first and second regions 12 and 14 different high temperature reinforcing fibers, or a mixture or blend of a plurality of high temperature reinforcing fibers. Each fiber or mixture of fibers has a different coefficient of expansion (CTE) at the temperature at which it operates, to provide, with the matrix, the above described "relationship". Each of the different fibers in the respective regions, or the mixture or blend, is tailored or selected between regions to provide in a region a strength level adequate to resist in the article the generation of excessive strain sufficient to cause degradation in the article structure across the entire operating temperature range. That embodiment of the invention uses, in a cooler region, a single kind of fiber or a mixture of fibers having, in the single kind of fiber or in the mixture of fibers, relatively high thermal expansion characteristics to yield appropriately higher thermal strain. Concurrently, that embodiment uses, in a relatively hotter region, fibers having, in the single kind of fiber or in the mixture of fibers, a relatively lower thermal expansion characteristic. The result, through the "relationship", is reduction in thermal strain, including, in some forms, resistance to biaxial thermal strains, in the cooler region that previously has resulted in cracking from excessive thermal strain. Examples of high temperature fibers used in forms of the present invention include, but are not limited to, at least one or a combination of alumina, silica, glass, graphite, carbon, carbides, tungsten, and boron.

Figure 2:
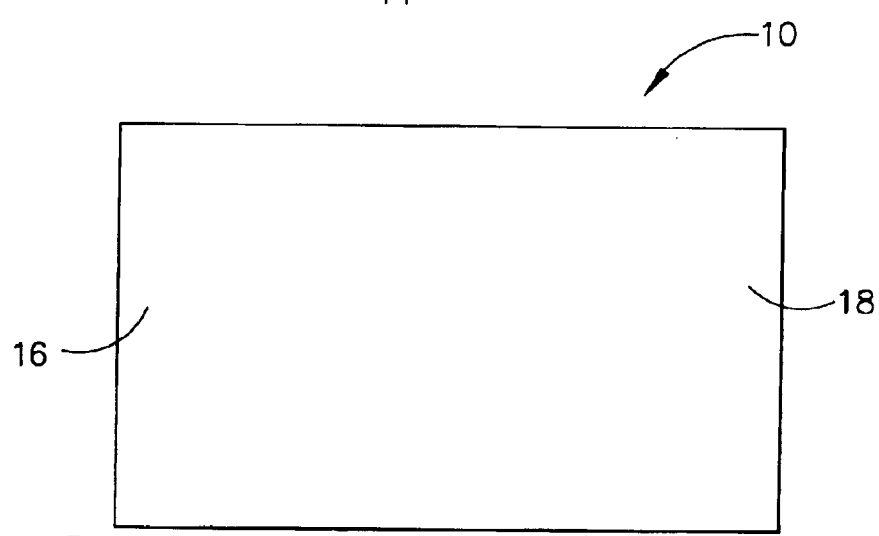
FIG. 2 is a diagrammatic view of a panel representing another form of the present invention, in which operating temperature varies substantially from a first end region to a second end region.

Another diagrammatic embodiment of a panel 10, intended to experience concurrently a plurality of temperatures in regions of the article during operation, is shown in the diagrammatic view of FIG. 2. In that embodiment, a first end region 16 experiences a first temperature greater than a second end region 18, spaced apart from first end region 16.

One embodiment of the present invention for reinforcing an alumina matrix used two kinds of fibers based on alumina in the "relationship". A first of the plurality of fibers, in a method for making a reinforcing member for use in making a fiber reinforced matrix composite article, selected predominantly for a first, higher temperature region of about 1650° F., representative of the range of about 1600–2000° F., had a first CTE of about $3.37 \times 10^{-6}$/° F. at that temperature of 1650° F. In this example, the first fiber predominantly for the higher temperature was the above described Nextel 720 ceramic fiber roving. A second of the plurality of fibers in this embodiment, used alone or in combination with other fibers for a second, lower or cooler temperature region of about 1100° F., representative of the range of about 900–1300° F., was a commercially available fiber Nextel 610 ceramic roving substantially of alumina, with a second CTE of about $3.93 \times 10^{-6}$/° F. at the second temperature, and greater than the first CTE at the first temperature.

The above-identified fibers were used in making one series of article specimens for evaluation of fiber reinforced ceramic matrix composite forms of the present invention. The matrix was an ultra pure, sub-micron size ceramic of substantially pure alumina, marketed by Baikowski International Corporation as SM8 material, mixed in a silica binder provided by the thermal decomposition of a polymer including silicon. The matrix comprised, by weight, about 80% alumina and about 20% silica. The specimens were woven fabric reinforced composites including various single or hybrid reinforcing mixtures of the above-identified Nextel 720, (identified below as "N7") and Nextel 610, (identified below as "N6") ceramic rovings. In this specific series of evaluations, the following values of the above-described "relationship" were used for the specimens:

$A_1$=0.66; $A_2$=0.33
$T_1$=1650° F.; $T_2$=1100° F.
$E_{N7}$: @$T_1$=11×10$^6$; @$T_2$=10.4×10$^6$
$E_{N6}$: @$T_1$=12×10$^6$; @$T_2$=11.8×10$^6$
$\alpha_{N7}$: @$T_1$=3.37×10$^{-6}$; @$T_2$3.03×10$^{-6}$
$\alpha_{N6}$: @$T_1$+4.45×10$^{-6}$; @$T_2$=3.93×10$^{-6}$
$S_{N7}$@$T_2$=21000 pounds per square inch (psi)
$S_{N6}$@$T_2$=35000 psi In one example, an article specimen had all Nextel 720 rovings as the reinforcing fiber. Using the above values, the difference of the two products in the "relationship" calculated to be a stress of about 28,900 psi. Because the stress value 28,900 psi is greater than the strength of about 21,000 psi of Nextel 720 material in the region at 1100° F., the region of such a fiber reinforced composite article at about 1100° F. can degrade and crack from the excessive stress.

In another example, an article specimen had all Nextel 610 rovings as the reinforcing fiber. Using the above values, the difference of the two products in the "relationship" calculated to be a stress of about 41,300 psi. Because the stress value 41,300 psi is greater than the strength of about 35,000 psi of Nextel 610 material in the region at about 1100° F., the region of such a fiber reinforced composite article at about 1100° F. can degrade and crack from excessive stress.

In still another example, this one according to a form of the present invention, an article specimen had all Nextel 720 rovings in the hotter region 1 at 1650° F. and all Nextel 610 rovings in the cooler region 2 at 1100° F. Using the above values, the difference in the two products of the "relationship" calculated to be a stress of about 23,500 psi. Because the operating stress value of 23,500 psi is less than the strength of about 35,000 psi in the region at 1100° F., the strength of the fiber in that region would exceed the operating stress. Therefore according to a form of the present invention, degradation or cracking in that region of an article would not occur, while the integrity of the hotter region at 1650° F. would be maintained using Nextel 720 rovings in that hotter region.

Figure 3:
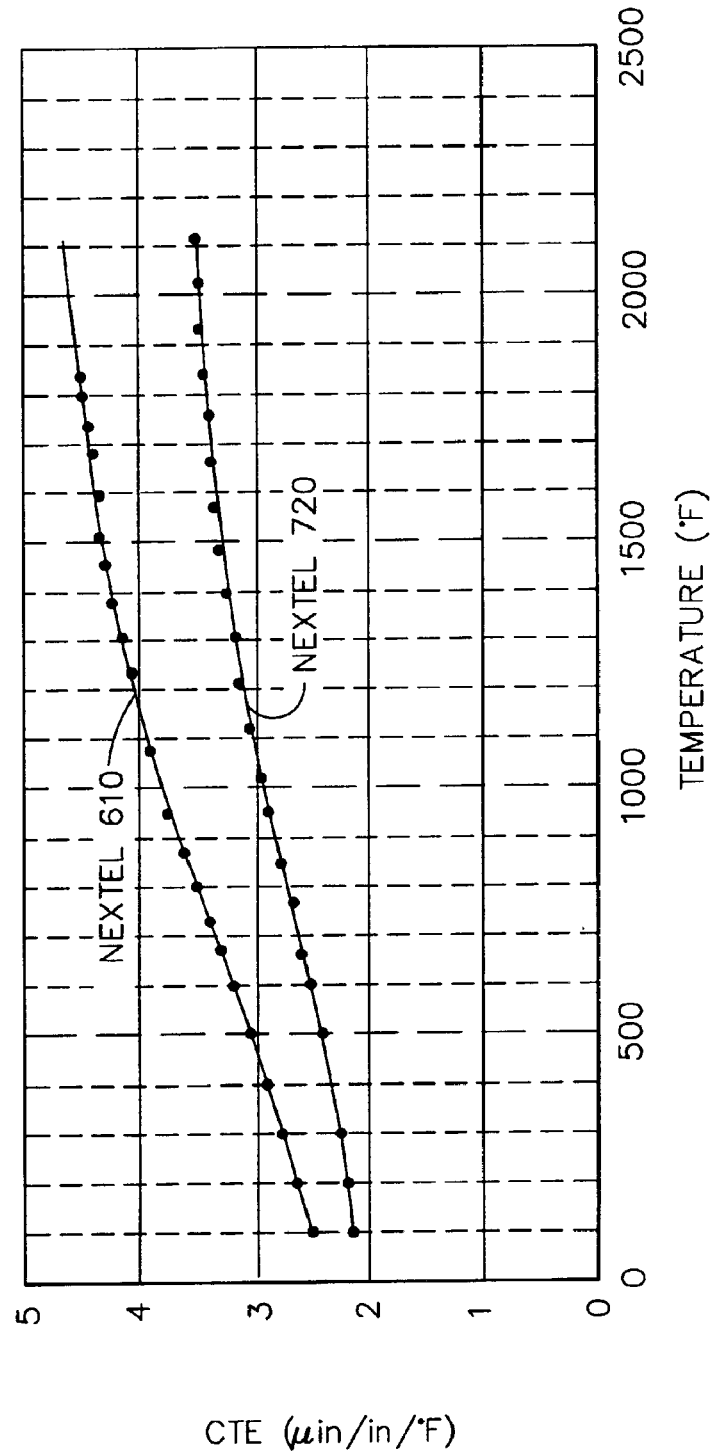
FIG. 3 is a comparison of variation in coefficient of thermal expansion across a range of temperatures for two different fiber reinforced matrix composite systems.

FIG. 3 is a graphical comparison of coefficients of thermal expansion at different temperatures of the above-identified Nextel 610 and Nextel 720 alumina-based ceramic rovings in an alumina-based matrix including silica, of the type described above. The data in FIG. 3 for those two types of fiber reinforced matrix composites represent the type of data that can be used in connection with the present invention in the "relationship" to select the type and amounts of fibers for the plurality of regions of an article, operating at different temperatures.

As can be appreciated, mixtures or blends of fibers concurrently for different regions of an article can be selected to be of a single type, and/or of various mixtures or blends as are appropriate to provide, according to embodiments of the present invention, the strength in a region greater than that region's operating stress. In one preferred embodiment of the present invention for a high temperature gas turbine engine component, fibers are selected for or included in a region of a matrix in the range of about 20–70% by volume. At least about 20 vol. % fiber is required to provide adequate reinforcement. A composite with greater than about 70 vol. % fiber includes insufficient matrix for the integrity of the composite.

Figure 4:
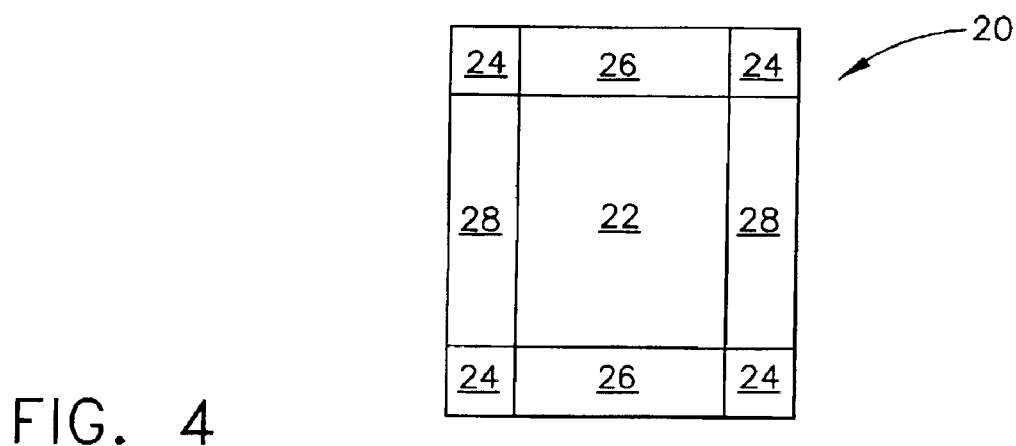
FIG. 4 is a diagrammatic view of a member in still another form of the present invention: in the form of woven fabric comprising, in selected areas, a single or a mixture of first and second fibers, according to the present invention, for use in making a fiber reinforced composite article.

One example of a member for fiber reinforcement provided in accordance with a form of the present invention and having concurrently a plurality of different combinations of fibers is shown in the diagrammatic view of FIG. 4. The member, shown diagrammatically generally at 20 in FIG. 4, is a woven fabric including various regions of fiber combinations for use as fiber reinforcement in a fiber reinforced composite article. In one form of manufacture of a fiber reinforced matrix composite article, a plurality of members 20 are disposed in a stack, for example maintaining the same relative position shown in FIG. 4, as the fiber reinforcement for a matrix.

Member 20, representing different combinations of fibers that can be selected, and if necessary combined, appropriately for intended operating conditions, was woven with different fiber combinations, in a pattern repeated in the fabric. Then the fabric was cut in desired shapes for stacking. Regions 22, representing a hottest operating region of a member, included all Nextel 720 rovings in both the warp and fill directions. Regions 24, representing a coolest operating region of a member, included all Nextel 610 rovings in both the warp and fill directions. Regions 26 and 28 represented regions with operating temperatures between those of regions 22 and 24. Region 26 included all Nextel 720 rovings in the warp direction and all Nextel 610 rovings in the fill direction. Region 28 included all Nextel 610 rovings in the warp direction and all Nextel 720 rovings in the fill direction. A plurality of this embodiment of a member of the present invention was arranged in a stack to provide the fiber reinforcement for a fiber reinforced alumina matrix composite. The composite included about 45 vol. % fibers, with the balance essentially alumina matrix, within the preferred range of about 20–70 vol. % fibers.

The present invention has been described, in various general embodiments and forms, in connection with specific examples and combinations. However, it should be understood that these are intended to be typical of rather than in any way limiting on the scope of the present invention. Those skilled in the various arts associated with this invention will understand that it is capable of variations, combinations and modifications without departing from the scope of the appended claims.

What is claimed is:

1. In a method for making a fiber reinforced matrix composite article comprising a first surface, a second surface, and a matrix and reinforcing fibers therebetween, the article experiencing a plurality of different operating temperature and stress combinations across each of the first and second surfaces, each different combination extending completely through the matrix and the first and second surfaces, the steps of:

calculating each of the different combinations;

selecting for each different combination a discrete region each extending across each of the first and second surfaces and completely through the first and second surfaces and the matrix therebetween, a first region experiencing therethrough a first operating temperature that develops a first stress, a second region experiencing therethrough a second operating temperature, less than the first operating temperature, that develops a second stress greater than the first stress;

selecting first fibers having a first coefficient of thermal expansion (CTE) at the first operating temperature to provide a first strength greater than the first stress;

selecting second fibers having a second CTE greater than the first CTE at the second operating temperature to provide a second strength greater than the second stress;

disposing the first fibers as reinforcing fibers in the matrix in the first region of the article; and, disposing the second fibers as reinforcing fibers in the matrix in the second region of the article.

2. The method of claim 1 in which a second strength of the second region is greater than the difference between the first stress and the second stress and is determined by the relationship:

$A_1 E_1 \alpha_1 T_1 - A_2 E_2 \alpha_2 T_2 < S_2$, in which, respectively for the first region (1) and the second region (2):

A is the area ratio of a region area to a total area of the regions,

E is the elastic modulus of the fiber reinforced matrix, $\alpha$ is the CTE of the fiber reinforced matrix at the operating temperature in ° F., T is the operating temperature in ° F., and S is the strength of the second region.

3. The method of claim 1 in which the first and second fibers are provided in at least one form selected from the group consisting of fabric, weave, braid, and lay-up for disposing in the first and second regions.

4. The method of claim 3 in which the first fibers and the second fibers are high temperature fibers are made from at least one material selected from the group consisting of alumina, silica, glass, graphite, carbon, carbides, tungsten boron and their mixtures.

5. The method of claim 3 for making a turbine engine fiber reinforced composite article in which:

the matrix of the composite article is based on alumina; and, the first fibers and the second fibers are disposed in the matrix in the range of about 20–70 volume %.

6. The method of claim 5 in which:

the composite article is a gas turbine engine exhaust flap;

the first operating temperature is in the range of about 1600–2000° F.;

the second operating temperature is in the range of about 900–1300° F.; and, the first and second fibers are based on alumina.

7. The method of claim 2 in which:

the composite article is a gas turbine engine blading component; and, the first fibers and the second fibers are disposed in the matrix in the range of about 20–70 volume %.

8. In a method for making a member for reinforcement of a fiber reinforced composite article, the member comprising a first surface, a second surface, and a matrix and reinforcing fibers therebetween, the member experiencing a plurality of different operating temperature and stress combinations across each of the first and second surfaces, each different combination extending completely through the matrix and the first and second surfaces, the steps of:

calculating each of the different combinations;

selecting for each different combination a discrete region each extending across each of the first and second surfaces and completely through the first and second surfaces and the matrix therebetween, a first region experiencing therethrough a first operating temperature that develops a first stress, a second region experiencing therethrough a second operating temperature, less than the first operating temperature, that develops a second stress greater than the first stress;

selecting first fibers having a first CTE at the first operating temperature to provide a first strength greater than the first stress;

selecting second fibers having a second CTE greater than the first CTE at the second operating temperature to provide a second strength greater than the second stress;

disposing the first fibers as reinforcing fibers in the matrix in the first region of the member; and, disposing the second fibers as reinforcing fibers in the matrix in the second region of the member.

9. The method of claim 8 in which a second strength of the second region is greater than the difference between the first stress and the second stress and is determined by the relationship:

$A_1 E_1 \alpha_1 T_1 - A_2 E_2 \alpha_2 T_2 < S_2$, in which, respectively for the first region (1) and the second region (2):

A is the area ratio of a region area to a total area of the regions,

E is the elastic modulus of the fiber reinforced matrix, $\alpha$ is the CTE of the fiber reinforced matrix at the operating temperature in ° F., T is the operating temperature in ° F., and S is the strength of the second region.

10. The method of claim 8 in which the first and second fibers are provided in at least one form selected from the group consisting of fabric, weave, braid, and lay-up for disposing in the first and second regions.

11. The method of claim 10 in which the first fibers and the second fibers are high temperature fibers are made from at least one material selected from the group consisting of alumina, silica, glass, graphite, carbon, carbides, tungsten boron and their mixtures.

12. The method of claim 8 for making a member for use as fiber reinforcement in a turbine engine fiber reinforced alumina-based matrix composite article in which:

the first temperature is in the range of about 1600–2000° F.;

the second temperature is in the range of about 900–1300° F.; and, the first fibers and the second fibers are disposed in the matrix in the range of about 20–70 volume %.

13. The method of claim 12 in which:

the composite article is a gas turbine engine exhaust flap; and, the first and second fibers are based on alumina.

14. The method of claim 8 for making a member for use as a fiber reinforcement in a fiber reinforced gas turbine engine blading component in which the first fibers and the second fibers are disposed in the matrix in the range of about 20–70 volume %.

* * * * *